(12) United States Patent
Usui

(10) Patent No.: US 7,740,122 B2
(45) Date of Patent: Jun. 22, 2010

(54) WORKPIECE TRANSFER APPARATUS

(75) Inventor: Hirokazu Usui, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 12/285,473

(22) Filed: Oct. 7, 2008

(65) Prior Publication Data
US 2009/0095596 A1  Apr. 16, 2009

(30) Foreign Application Priority Data
Oct. 10, 2007   (JP)  ............... 2007-264738

(51) Int. Cl.
B65G 37/00  (2006.01)

(52) U.S. Cl. ............... 198/346.3; 198/465.4; 198/678.1
(58) Field of Classification Search ............ 198/346.2, 198/346.3, 678.1, 680, 465.4; 414/225.01, 414/226.01; 901/7
See application file for complete search history.

(56) References Cited

U.S. PATENT DOCUMENTS

| | | | | |
|---|---|---|---|---|
| 5,321,874 A * | 6/1994 | Mills et al. | .................. | 29/33 P |
| 5,368,539 A * | 11/1994 | Mills et al. | ...................... | 483/1 |
| 5,894,754 A * | 4/1999 | Sartorio | ........................ | 72/422 |
| 5,919,012 A * | 7/1999 | Nakagawa et al. | .......... | 409/132 |
| 5,933,933 A * | 8/1999 | Fritz et al. | .................. | 29/33 P |
| 6,074,329 A * | 6/2000 | Hirano et al. | .................. | 483/15 |
| 6,666,632 B1 * | 12/2003 | Fioroni | ........................ | 409/192 |
| 6,722,836 B2 * | 4/2004 | Jager | ..................... | 414/222.01 |
| 6,745,454 B1 * | 6/2004 | Grimshaw et al. | ............ | 29/563 |
| 6,904,665 B2 * | 6/2005 | Walz | ........................... | 29/563 |
| 7,334,314 B2 * | 2/2008 | Nussbaum et al. | ............ | 29/564 |
| 7,334,673 B2 * | 2/2008 | Boberg et al. | .......... | 198/341.08 |
| 2008/0073821 A1 | 3/2008 | Usui | | |

FOREIGN PATENT DOCUMENTS

| JP | A-S61-014844 | 1/1986 |
|---|---|---|
| JP | A-H5-160597 | 6/1993 |

OTHER PUBLICATIONS

U.S. Appl. No. 12/285,474, filed Oct. 7, 2008, Usui.
U.S. Appl. No. 12/285,475, filed Oct. 7, 2008, Usui.
Office Action mailed Oct. 20, 2009 from the Japan Patent Office in corresponding patent application No. 2007-264738 (and English translation).

* cited by examiner

Primary Examiner—Douglas A Hess
(74) Attorney, Agent, or Firm—Posz Law Group, PLC

(57) ABSTRACT

A workpiece transfer apparatus is provided for transferring workpieces throughout an entire transfer path. A workpiece is transferred along a production line and is processed by processing facilities. Workpiece graspers grasp a workpiece. Rails are arranged above the processing facilities and movably hang the workpiece graspers. The rails are arranged so that at least the two of the rails partially overlap with each other above at least one of the processing facilities.

6 Claims, 4 Drawing Sheets

WORKPIECE TRANSFER APPARATUS

CROSS REFERENCE TO RELATED APPLICATIONS

The present application is based on and claims priority to Japanese Patent Application JP 2007-264738, filed on Oct. 10, 2007, the entire contents of which are incorporated herein by reference.

BACKGROUND OF THE INVENTION

1. Field of the Invention

The invention relates to a workpiece transfer apparatus and more specifically to transferring a workpiece processed at one processing facility to another processing facility on a production line provided with multiple processing facilities.

2. Description of the Related Art

An electronic circuit board transfer apparatus described in JP-H5-160597 provides an example of a workpiece transfer apparatus for transferring a workpiece processed at a processing facility to another processing facility.

The electronic circuit board transfer apparatus is provided with blocks D, C, B, and A in order from an upper stream of the direction for transferring electronic circuit boards. The block D carries in a board and prepares the board for the next process. The blocks C and B mount parts on the board. The block A carries out the board. The electronic circuit board transfer apparatus is also provided with a transfer mechanism having a belt conveyor. The electronic circuit board is placed on the belt conveyor and is transferred to the other blocks.

FIG. 8A shows an available workpiece transfer apparatus for transferring workpieces. The workpiece transfer apparatus includes rails 30a and 30b and workpiece graspers 10a and 10b hereafter also referred to simply as graspers. The rails 30a and 30b are provided above processing facilities 40a through 40d hereafter also referred to simply as facilities and extend in a direction for transferring a workpiece (not shown). The workpiece graspers 10a and 10b movably hang down from the rails 30a and 30b. The processing facilities 40a through 40d are provided with jigs 50a through 50d for mounting workpieces. For example, the workpiece transfer apparatus uses the workpiece grasper 10a to grasp a workpiece on the processing facility 40a. The workpiece transfer apparatus transfers a workpiece by moving the workpiece grasper 10a to a position above the processing facility 40b along the rail 30a and placing the workpiece on the processing facility 40b. The workpiece transfer apparatus thereby transfers workpieces from the facility 40a to the facility 40d.

The rail 30a or 30b for hanging the grasper 10a or 10b has a certain length such as three to five meters for ease of manufacturing and installation. When the entire line is longer than the rail 30a or 30b, the rails 30a and 30b need to be connected to each other as shown in FIG. 8A. When the rails 30a and 30b are simply connected to each other, the grasper 10a moves only between the facilities 40a and 40b as shown in FIG. 8B. The grasper 10b moves only between the facilities 40c and 40d. No workpiece can be transferred between the facilities 40b and 40c.

To address transfer between facilities, a feeder 400 may be provided between the facilities 40b and 40c, namely, at a position where a movable end of the grasper 10a is adjacent to that of the grasper 10b, as shown in FIG. 9. The feeder 400 has a slidable jig 500 for feeding workpieces.

The provision of the feeder requires an extra transfer operation of the feeder. In the present example, the number of transfer operation increases from three to four throughout the entire transfer path. Further, the provision of the feeder increases the cost of the transfer path and increases the cost of the entire production line.

SUMMARY OF THE INVENTION

The present embodiment has been made in consideration of the foregoing. It is therefore an object of the present embodiment to provide a workpiece transfer apparatus capable of transferring workpieces throughout an entire transfer path without increasing invested costs and requiring an unnecessary transfer operation.

To achieve the above-mentioned object, a workpiece transfer apparatus is used for a production line where a workpiece is transferred and is processed by a plurality of processing facilities. The workpiece transfer apparatus includes a workpiece grasper capable of grasping the workpiece, and multiple rails that are arranged above the processing facilities and movably hang the workpiece grasper. The multiple rails are arranged so that at least two rails partially overlap with each other above at least one of the plurality of processing facilities.

When a workpiece is placed on a processing facility positioned at the end of the rail, a workpiece grasper hanging from another rail can grasp and transfer the workpiece. There is no need for using a rail corresponding to a full length of the processing facilities. In addition, there is no need for using a feeder to slide the workpiece to a position corresponding to the end of the rail. The workpiece can be transferred throughout the processing facilities without using a feeder for sliding the workpiece.

The processing facilities may include a jig for mounting the workpiece. The jig may be provided in accordance with a position of the rail.

There is no need for changing the processing facility position depending on the rail position.

The workpiece grasper may be arranged so as to be shifted toward a rail adjacent to a rail where the workpiece grasper hangs.

The workpiece grasper can grasp and seat a workpiece at the same area of a processing facility where at least two rails are partially arranged so as to overlap with each other. There is no need for changing the processing facility position depending on the rail position.

The processing facilities may be arranged straight.

When a row of the processing facilities and a row of another processing facilities are arranged so as to differ from each other in transfer directions, the processing facilities are arranged so that at least two rails partially overlap above one of the processing facility at the end of the row of the processing facilities and the processing facility adjacent to a processing facility at the end of the row of another processing facilities.

The workpiece can be transferred throughout the processing facilities even when the row of the processing facilities and the row of another processing facilities are arranged so as to differ from each other in transfer directions,

BRIEF DESCRIPTION OF THE DRAWINGS

Other objects, features and characteristics of the present invention will be appreciated and become apparent to those of ordinary skill in the art and all of which form a part of the present application. In the drawings.

DETAILED DESCRIPTION OF THE EXEMPLARY EMBODIMENTS

Embodiments will be described in further detail with reference to the accompanying drawings.

Figure 1:
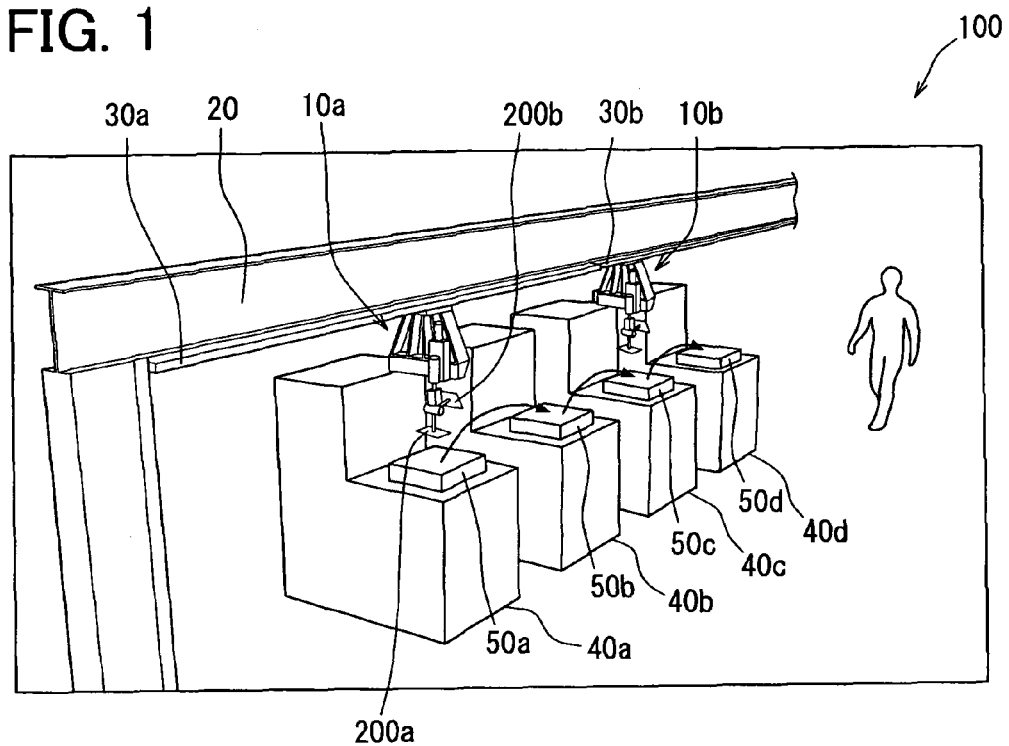
FIG. 1 is a diagram illustrating an exemplary construction of a workpiece transfer apparatus according to a present embodiment.

As shown in FIG. 1, the workpiece transfer apparatus according to the embodiment is used for a production line 100 that automatically transfers workpieces 200a and 200b (generically referred to as a workpiece 200 for ease of description) and processes the workpiece 200 using processing facilities 40a through 40d having jigs 50a-50d (generically referred to as jigs 50 for ease of description) appropriate for workpiece shapes. The workpiece transfer apparatus is used for the production line 100 that processes the workpiece 200 including a printed board or a printed circuit board mounted with circuit parts on the printed board.

The production line 100 is provided with processing facilities 40a through 40d, hereafter also referred to simply as facilities, and a workpiece transfer apparatus. The processing facilities 40a through 40d are provided correspondingly to processes of the workpiece 200. The workpiece transfer apparatus transfers the workpiece 200 to the processing facilities 40a through 40i. The embodiment shows an example that arranges the processing facilities 40a through 40d in an approximately straight configuration. The processing facilities 40a through 40d are provided with the jigs 50 for mounting the workpiece 200. The jig 50 is shaped in accordance with the shape or external form of the workpiece 200. The workpiece transfer apparatus has the rails 30a and 30b for moving the workpiece graspers 10a and 10b that are controlled by an controller (not shown).

A support beam 20 is provided above the processing facilities 40a through 40d to support or suspend the workpiece graspers 10a and 10b as transfer robots that grasp and transfer the workpiece 200. More specifically, the support beam 20 is provided above the jigs 50 provided for the processing facilities 40a through 40d. The support beam 20 is provided with the rails 30a and 30b in the gravity direction against the processing facilities 40a through 40d. The rails 30a and 30b movably support the workpiece grasper 10 in the length direction of the support beam 20.

The support beam 20 and the rails 30a and 30b are provided so as to cover a row at least from one end to the other end thereof. In the row, the processing facilities 40a through 40d are arranged. That is, the support beam 20 and the rails 30a and 30b are contiguously provided above all the processing facilities 40a through 40i. The workpiece grasper 10 can move throughout all the processing facilities 40a through 40d. For example, a linear motor moves the workpiece graspers 10a and 10b while the workpiece graspers 10a and 10b hang from the rails 30a and 30b as linear motor drive rails.

The following describes the workpiece grasper 10 as a transfer robot. The workpiece graspers 10a and 10b have the same construction and only the workpiece grasper 10a will be described.

Figure 2:
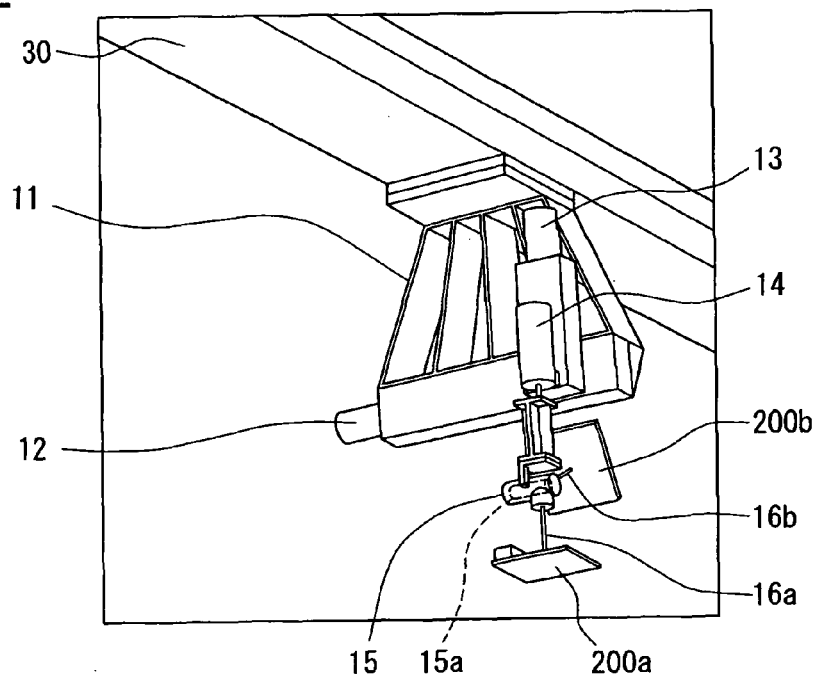
FIG. 2 is a diagram illustrating an exemplary construction of a workpiece grasper according to an embodiment.

As shown in FIG. 2, the workpiece grasper 10a includes a support section 11, a Y-axis adjusting section 12, a Z-axis adjusting section 13, a θ-axis adjusting section 14, a base member 15, and hands 16a and 16b. The support section 11 is provided with the Y-axis adjusting section 12, the Z-axis adjusting section 13, the θ-axis adjusting section 14, the base member 15, and the hands 16a and 16b included in the workpiece grasper 10. The support section 11 is provided with an drive section (not shown) that movably hangs from the rail 30a.

The Y-axis adjusting section 12 includes an actuator and adjusts the hands 16a and 16b in the Y-axis direction. The Y-axis direction is parallels the ground and is perpendicular to the transfer direction of the workpiece 200. The Y-axis adjusting section 12 adjusts the hands 16a and 16b in the Y-axis direction based on instructions from the controller.

The Z-axis adjusting section 13 includes an actuator and adjusts the hands 16a and 16b in the Z-axis direction. The Z-axis direction is perpendicular to the ground. The Z-axis adjusting section 13 moves the hands 16a and 16b perpendicularly to the ground to move the workpiece 200 near to or far from the processing facilities 40a through 40b. In other words, the. Z-axis adjusting section 13 vertically moves the hands 16a and 16b. The Z-axis adjusting section 13 adjusts the hands 16a and 16b in the Z-axis direction based on instructions from the controller.

The θ-axis adjusting section 14 includes an actuator and adjusts the hands 16a and 16b in the θ-axis direction. The θ-axis direction represents a rotation direction around the direction perpendicular to the ground as a rotation axis. The θ-axis adjusting section 14 rotates the hands 16a and 16b around the rotation axis that is the direction perpendicular to the ground. The θ-axis adjusting section 14 adjusts the hands 16a and 16b in the θ-axis direction based on instructions from the controller.

The base member 15 is provided with the two hands 16a and 16b opened at a specified angle and includes a rotation mechanism 15a as a switching mechanism including an actuator. The rotation mechanism 15a rotates the base member 15 above a line along the transfer direction of the workpiece 200. The base member 15 rotates above the line along the transfer direction of the workpiece 200 while supporting the two hands 16a and 16b. In other words, the rotation mechanism 15a allows the base member 15 to parallel the ground and rotate around the rotation axis perpendicular to the transfer direction of the workpiece 200. The hands 16a and 16b are provided to the base member 15 so as to be opened at a specified angle centering around the rotation axis.

According to the embodiment, the rotation mechanism 15a rotates the base member 15 to switch between the hands 16a and 16b. The rotation mechanism 15a switches between the hands 16a and 16b for grasping the workpiece 200 from the processing facilities 40a through 40i and switches between the hands 16a and 16b for mounting the grasped workpiece 200 onto the processing facilities 40a through 40i. In other words, switching between the hands 16a and 16b is equivalent to selecting the hand 16a or 16b to be positioned against the jigs 50a through 50f or the workpiece 200 mounted on the jigs 50a through 50f. The hands 16a and 16b may be provided so as to be attached to or detached from the base member 15.

The hands 16a and 16b independently hold and mount the workpiece 200. The hands 16a and 16b may use cylindrical members to hold the workpiece 200 with vacuum or may grip the workpiece 200 therebetween. When the workpiece 200 has a hole, the hands 16a and 16b may be inserted into the hole to hold the workpiece 200. The hand has an internal pipe and a rod member. The internal pipe has a cylindrical portion extending in the axis direction of the hole and a divided portion that is divided into multiple portions at the end of the cylindrical portion. The rod member has a projected portion that is smaller than the hole and is larger than the opening of the internal pipe. Before part of the internal pipe and the rod member is inserted into the hole, the projected portion is placed outside the internal pipe. When part of the internal pipe and the rod member is inserted into the hole, the rod member moves opposite to the insertion direction to place the projected portion inside the internal pipe. The projected portion widens the divided portion, and the divided portion holds the workpiece 200. In many cases, a hole is provided for a printed board or a printed circuit board used as the workpiece 200 as mentioned above. Even when no hole is provided, it is relatively easy to provide a hole with minimal effect on the design and the function of the workpiece.

The two hands 16a and 16b can simultaneously hold different workpieces 200. In addition, one hand such as the hand 16a can hold the workpiece 200 and the other hand such as the hand 16b can seat the workpiece 200. While one hand such as the hand 16a grasps the workpiece 200 from any one of the processing facilities 40a through 40i, the other hand such as the hand 16b can seat the grasped workpiece 200 on the processing facility. It is possible to shorten the time to stop the processing facilities 40a through 40i.

The two hands 16a and 16b can be easily switched by rotating the base member 15 to rotate the hands 16a and 16b above the line along the transfer direction of the workpiece 200.

The following describes an example of transferring the workpiece between the processing facilities 40a through 40c. According to a transfer diagram using the workpiece grasper 10 and the workpiece transfer apparatus of the embodiment, the hand 16a of the two hands grasps the workpiece 200 from the facility 40a in a first process. The workpiece grasper 10a moves to the next facility 40b and the rotation mechanism 15a switches the hand 16a to the hand 16b for grasping the workpiece in a second process. The hand 16b grasps the workpiece 200 from the facility 40b in a third process. After the third process, the rotation mechanism 15a switches the hand 16b to the hand 16a in a fourth process. After the fourth process, the hand 16a places the grasped workpiece 200 on the facility 40b in a fifth process. After the fifth process, the workpiece grasper 10 moves to the next facility 40c and the hand 16a grasps the workpiece 200 from the facility 40c in a sixth process. After the sixth process, the rotation mechanism 15a switches the hand 16a to the hand 16b for seating the workpiece. This is a seventh process. After the seventh process, the hand 16b places the grasped workpiece 200 on the facility 40c in an eighth process.

In other words, the hand 16a picks up the workpiece 200 from the facility 40a and moves to the facility 40b. The hand 16a is changed to the other hand 16b. The hand 16b picks up the workpiece 200 from the facility 40b. The hand 16b is then changed to the hand 16a. The hand 16a places the grasped workpiece 200 on the facility 40b. The facility 40b is ready for operation at this time. That is, the facility 40b stops while the workpiece grasper 10a moves up and down four times. Consequently, it is possible to shorten the time to stop the facilities while the workpiece is replaced.

The rail has a certain length such as three to five meters for ease of manufacturing and installation. When the entire line is longer than the rail, the rails 30a and 30b are connected as described in the embodiment. When multiple rails such as the rails 30a and 30b are connected, it is preferable to partially overlap at least two rails 30a and 30b with each other to be offset above at least one of the multiple processing facilities 40a through 40d or above the processing facility 40c in this embodiment. In other words, for example, adjacent rails such as the rails 30a and 30b are overlapped as long as a rail width in the transfer direction so that both rails cover a facility at the transfer boundary such as the facility 40c in FIG. 3.

The workpiece grasper 10 hanging from the other rail can grasp and transfer the workpiece 200 on the facility at the end of the rail such as the facility 40. There is no need for using a rail corresponding to a full length of the processing facilities 40a through 40d. In addition, there is no need for using a feeder to slide the workpiece 200 to a position corresponding to the end of the rail. The workpiece can be transferred throughout the processing facilities without using a feeder for sliding the workpiece.

Figure 3:
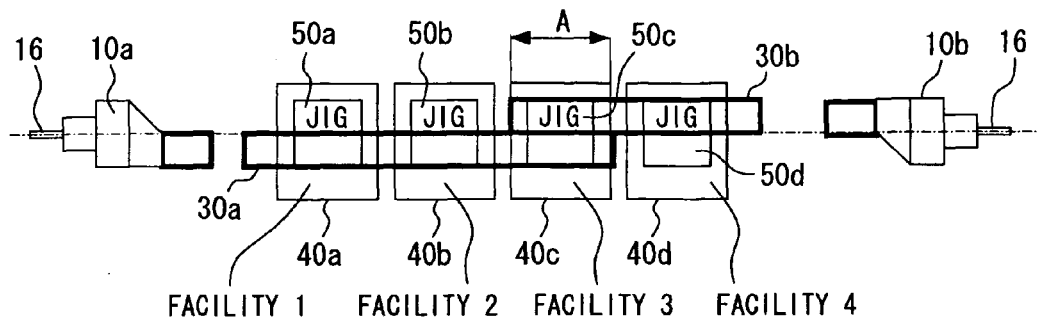
FIG. 3 is a diagram illustrating an exemplary arrangement of workpiece graspers according to an embodiment.

As shown in FIG. 3, for example, the workpiece grasper 10a hanging from the rail 30a transfers the workpiece 200 to the facility 40c. The workpiece grasper 10b hanging from the rail 30b then transfers the workpiece 200 from the facility 40c to the facility 40d.

Figure 4:
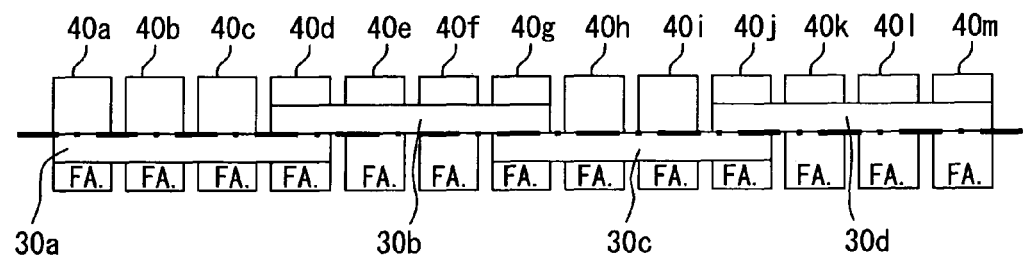
FIG. 4 is a diagram illustrating a top view another exemplary arrangement of workpiece graspers according to an embodiment.

FIG. 4 shows that the production line 100 is provided with 13 processing facilities 40a through 40m. In this case, rails 30a through 30d are offset so as to cover the entire length of the production line 100. According to the example of FIG. 4, the workpiece grasper 10 hanging from the rail 30a transfers the workpiece 200 from the processing facility 40a to the processing facility 40d. The workpiece grasper 10 hanging from the rail 30b transfers the workpiece 200 from the processing facility 40d to the processing facility 40g. The workpiece grasper 10 hanging from the rail 30b transfers the workpiece 200 from the processing facility 40d to the processing facility 40g. The workpiece grasper 10 hanging from the rail 30c transfers the workpiece 200 from the processing facility 40g to the processing facility 40j. The workpiece grasper 10 hanging from the rail 30c transfers the workpiece 200 from the processing facility 40g to the processing facility 40j. The workpiece grasper 10 hanging from the rail 30d transfers the workpiece 200 from the processing facility 40j to the processing facility 40m. In this manner, multiple rails such as the rails 40a through 40d are offset to be applicable to a production line having any length.

Figure 5:
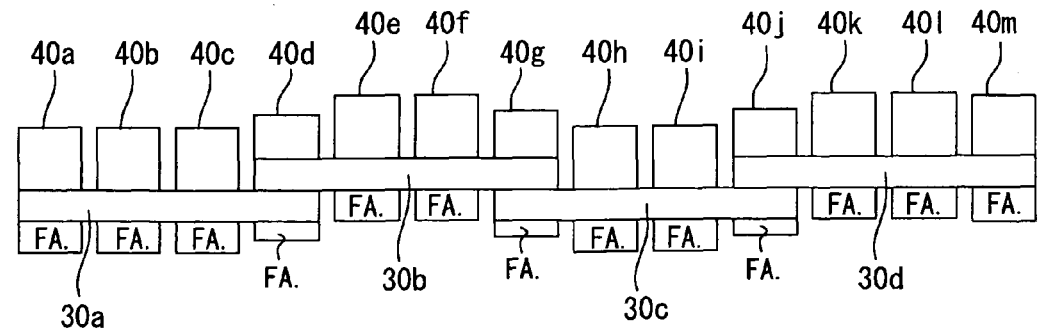
FIG. 5 is a diagram illustrating a top view of an arrangement of the workpiece transfer apparatus according to a comparison example.

When the processing facilities 40a through 40m are assigned the same position for the jig 50 to mount the workpiece 200, offsetting the rails 30a through 30d misaligns the mounting places as shown in FIG. 5. For example, the mounting places are misaligned between a group of the processing facilities 40a through 40c and the processing facility 40d, between the processing facility 40d and a group of the processing facilities 40e and 40f, and between a group of the processing facilities 40a through 40c and a group of the processing facilities 40e and 40f. When the mounting places for the processing facilities are misaligned, it is not preferable to provide a safety wall that separates a process area for placing the processing facilities 40a through 40m from a peripheral area where a worker can move. To solve this problem, it is preferable to provide the processing facilities 40a through 40m with the jigs 50 corresponding to the positions of the rails 30a through 30d arranged above making it possible to align the places for installing the processing facilities 40a through 40m and easily provide the safety wall.

Offsetting the workpiece graspers 10 against the rail can also align installation places for the processing facilities 40a through 40m. The workpiece grasper 10 is perpendicular to the transfer direction of the workpiece 200 and is shifted toward a rail adjacent to the rail where the workpiece grasper 10 is suspended.

In FIG. 3, for example, the workpiece grasper 10b hanging from the rail 30b is offset toward the rail 30a. By contrast, the workpiece grasper hanging from the rail 30a is offset toward the rail 30b. Offsetting the workpiece graspers 10a and 10b positions the hands 16 of both workpiece graspers 10a and 10b above the same line.

Even though rails are offset at different positions, the workpiece graspers 10 such as the workpiece graspers 10a and 10b can pick up and seat the workpiece 200 at the same area of the facility 40c where two rails such as the rails 30a and 30b partially overlap. Places for installing multiple processing facilities can be aligned.

Figure 6:
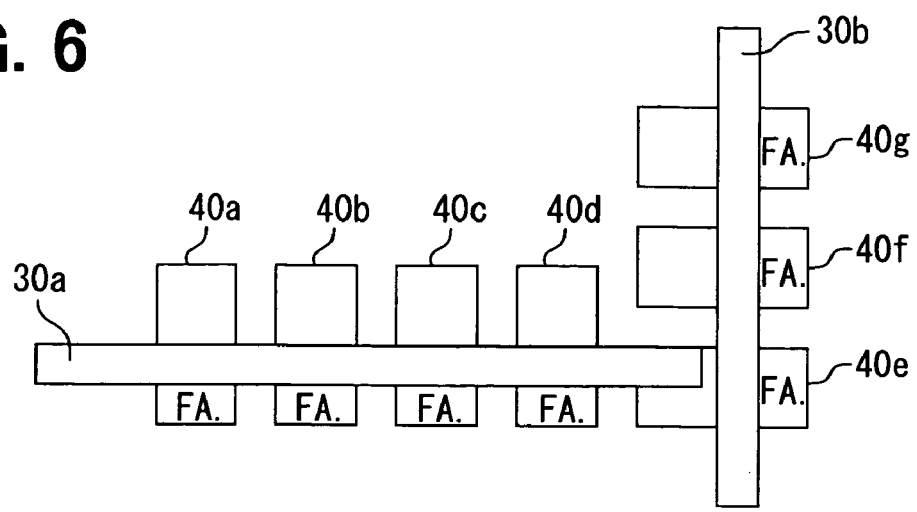
FIG. 6 is a diagram illustrating a top view another example of an arrangement of the workpiece transfer apparatus according to an embodiment.
Figure 7:
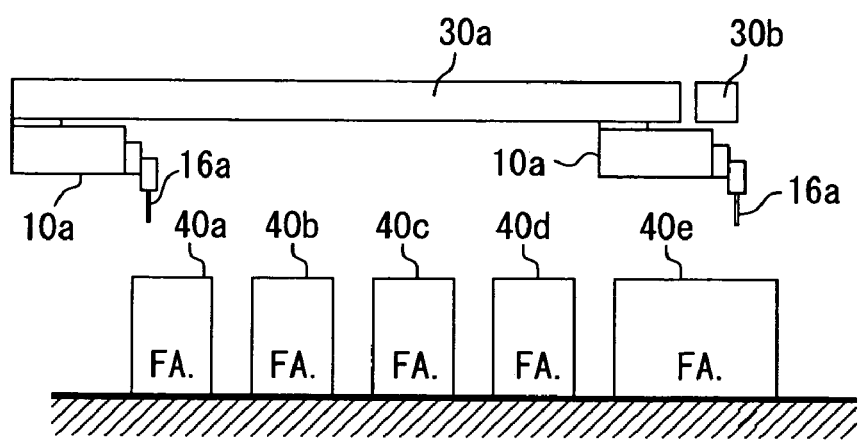
FIG. 7 is a diagram a front view of the workpiece grasper in FIG. 6.
Figure 8A:
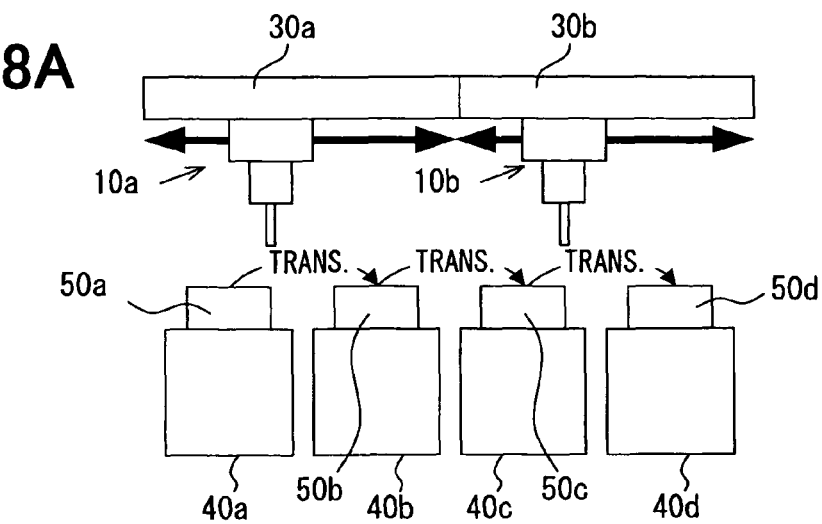
FIG. 8A is a diagram illustrating a front view of an exemplary construction of the workpiece transfer apparatus according to a comparison example.
Figure 8B:
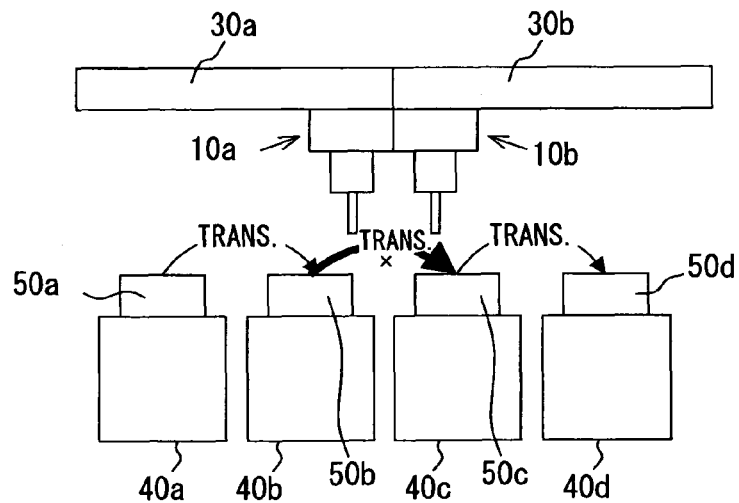
FIG. 8B is a diagram illustrating another front view of an exemplary construction of the workpiece transfer apparatus according to the comparison example.
Figure 9:
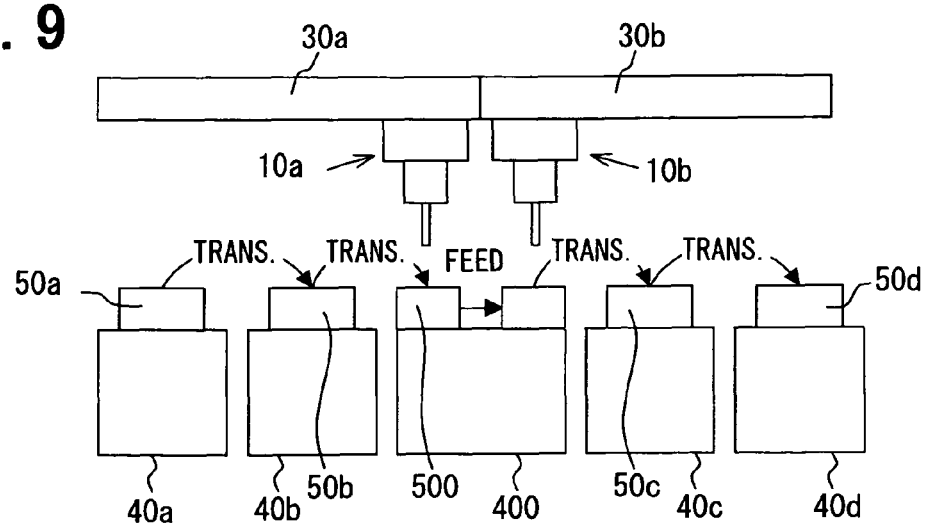
FIG. 9 is a diagram illustrating a front view of an exemplary construction of the workpiece transfer apparatus according to another comparison example.

The production line 100 of processing facilities may not be installed in an approximately straight line depending on a floor area for installing the production line 100. The transfer direction may need to be changed along the way as shown in FIG. 6 and FIG. 7. In such case, the processing facilities are arranged so that at least two rails partially overlap above one of a processing facility at the end of a row of processing facilities and a processing facility adjacent to a processing facility at the end of a row of other processing facilities.

According to examples in FIG. 6 and FIG. 7, the transfer direction of the workpiece 200 along the processing facilities 40a through 40d is approximately perpendicular to the transfer direction of the workpiece 200 along the processing facilities 40e through 40g. The rails 30a and 30b are arranged so as to partially overlap with each other above the processing facility 40e. The workpiece can be transferred throughout the processing facilities 40a through 40g in which a row of processing facilities 40a through 40d differs from a row of another processing facilities 40e through 40g in directions of transferring the workpiece 200.

When the transfer direction is changed along the way, the workpiece grasper 10a is offset against the rail as shown in FIG. 7. The workpiece grasper 10a is shifted toward the rail 30b adjacent to the rail 30a where the workpiece grasper 10a hangs. In other words, the workpiece grasper 10a is offset against the rail 30a above the processing facility 40e where the two workpiece graspers partially overlap with each other, so as to be capable of positioning the hands of the workpiece graspers 10a and 10b in the same area. The workpiece grasper 10a can place the grasped workpiece 200 on the processing facility 40e.

What is claimed is:

1. A workpiece transfer apparatus for a production line transferring a workpiece between a first plurality of processing facilities and a second plurality of processing facilities for processing the workpiece, the apparatus comprising:
    a first workpiece grasper capable of grasping the workpiece in one of the first plurality of workpieces;
    a second workpiece grasper capable of grasping the workpiece in one of the second plurality of workpieces;
    a first plurality of rails that are arranged above the first plurality of processing facilities and movably hanging the first workpiece grasper; and
    a second plurality of rails that are arranged above the second plurality of processing facilities and movably hanging the second workpiece grasper,
    wherein the first plurality of rails and the second plurality of rails are arranged so that at least one of the first plurality of rails and at least one of the second plurality of rails both at least partially overlap a selected processing facility, which belongs to either one of the first plurality of processing facilities and the second plurality of processing facilities.

2. The workpiece transfer apparatus of claim 1,
    wherein the first plurality of processing facilities and the second plurality of processing facilities include a jig for mounting the workpiece; and
    wherein the jig is provided in accordance with a position of the rail.

3. The workpiece transfer apparatus of claim 1,
    wherein the first workpiece grasper is arranged so as to be shifted at a same elevation from the ground toward one of the second plurality of rails where the second workpiece grasper hangs.

4. The workpiece transfer apparatus of claim 1,
    wherein the plurality of processing facilities are arranged in an approximately straight line.

5. The workpiece transfer apparatus of claim 1,
    wherein, when a row of the first plurality of processing facilities and a row of the second plurality of processing facilities are arranged so as to differ from each other in transfer directions, the first plurality of processing facilities and the second plurality of processing facilities are arranged so that at least one rail of the first plurality of rails and at least one rail of the second plurality of rails partially overlap, at a same elevation from the ground, above a one of the first plurality of processing facilities and the second plurality of processing facilities at an end of the row of the first plurality of processing facilities adjacent an end of the row of the second plurality of processing facilities.

6. A workpiece transfer apparatus for transferring a workpiece in a production, the apparatus comprising:
    a first plurality of processing facilities arranged in a row in a first predetermined direction;
    a second plurality of processing facilities arranged in a row in a second predetermined direction different from the first predetermined direction, a first processing facility of the second plurality of processing facilities being arranged adjacent to a last processing facility of the first plurality of processing facilities;
    a first workpiece grasper capable of grasping the workpiece so that the workpiece is processed by the first plurality of processing facilities;
    a second workpiece grasper capable of grasping the workpiece so that the workpiece is processed by the second plurality of processing facilities;
    a first rail movably hanging the first workpiece grasper and arranged above the first plurality of processing facilities to transfer the first workpiece grasper in the first predetermined direction to the last processing facility of the first plurality of processing facilities; and
    a second rail movably hanging the second workpiece grasper and arranged above the second plurality of processing facilities to transfer the workpiece in the second predetermined direction from the first processing facility of the second plurality of processing facilities,
    wherein the first rail and the second rail are provided at a same height from the ground, and
    wherein the first rail and the second rail both overlap over either one of the last processing facility and the first processing facility so that a direction of transfer of the workpiece is changed from the first predetermined direction to the second predetermined direction above the either one of the last processing facility and the first processing facility.

* * * * *